United States Patent [19]
Nishimura et al.

[11] Patent Number: 5,540,965
[45] Date of Patent: Jul. 30, 1996

[54] WOVEN FABRIC FOR HIGH PERFORMANCE AIR BAGS AND PROCESS FOR PRODUCING SAME

[75] Inventors: Kunio Nishimura, Scarsdale, N.Y.; Shiro Kumakawa, Chiba, Japan; Koji Sato, Ibaraki, Japan; Hideo Nakagawa, Takatsuki, Japan

[73] Assignee: Teijin Limited, Osaka, Japan

[21] Appl. No.: 454,203

[22] PCT Filed: Oct. 13, 1994

[86] PCT No.: PCT/JP94/01719

§ 371 Date: Jul. 10, 1995

§ 102(e) Date: Jul. 10, 1995

[87] PCT Pub. No.: WO95/10652

PCT Pub. Date: Apr. 20, 1995

[30] Foreign Application Priority Data

Oct. 13, 1993 [JP] Japan ................ 5-278885
Jun. 7, 1994 [JP] Japan ................ 6-147038
Jun. 7, 1994 [JP] Japan ................ 6-147039

[51] Int. Cl.$^6$ .................................................. B29D 22/00
[52] U.S. Cl. .................. 428/36.1; 26/18.5; 26/18.6; 280/728.1; 428/57; 428/58; 428/102; 428/225; 428/229; 428/409; 428/65.1
[58] Field of Search .................... 26/18.5, 18.6; 428/36.1, 57, 58, 64, 66, 102, 225, 229, 409; 280/728 R

[56] References Cited

U.S. PATENT DOCUMENTS 4,921,735 5/1990 Bloch ........................... 428/34.9
4,977,016 12/1990 Thornton et al. ................ 428/225
5,236,775 8/1993 Swoboda et al. ................ 428/225
5,356,680 10/1994 Krummheuer et al. ............. 428/36.1

FOREIGN PATENT DOCUMENTS 442373 7/1991 European Pat. Off. .
3167312 7/1991 Japan .
4556653 2/1992 Japan .
2835 7/1992 Japan .
214437 8/1992 Japan .
4214437 8/1992 Japan .
262938 9/1992 Japan .
5195419 8/1993 Japan .
5214632 8/1993 Japan .

*Primary Examiner*—James J. Bell
*Attorney, Agent, or Firm*—Burgess, Ryan & Wayne

[57] ABSTRACT

A woven fabric useful for air bags capable of smoothly opening in an initial stage of inflation and having a high burst strength and an excellent safety satisfies all the requirement that (A) a stress strain curve of the woven fabric in at least one of the warp and weft directions is a substantially downwardly convex curve, where the elongation $\epsilon$ is in the range: $1\% \leq \epsilon \leq 20\%$;

(B) where the elongation $\epsilon$ is in the range: $\epsilon \leq 10\%$, the tensile strength $S(\epsilon)$ of the woven fabric is 10 to 100 kg/3 cm in both the warp and weft directions; and (C) the woven fabric has a tensile toughness of 2,000 to 4,000 kg.%/3 cm in both the warp and weft directions, the tensile toughness being represented by an area of a region, in a graph showing a stress-strain curve of the woven fabric in each of the warp and weft directions, defined by the stress-strain curve and an abscissa corresponding to a stress of zero.

18 Claims, 5 Drawing Sheets

PRIOR ART

Fig.3B

PRIOR ART

Fig.4

Fig.5

WOVEN FABRIC FOR HIGH PERFORMANCE AIR BAGS AND PROCESS FOR PRODUCING SAME

TECHNICAL FIELD

The present invention relates to a woven fabric for air bags and a process for producing same. More particularly, the present invention relates to a woven fabric useful for the production of high performance air bags exhibiting, upon being inflated, a high capability of smoothly opening at an initial stage of the inflation and a high burst strength, and a process for producing the same.

TECHNICAL BACKGROUND

Air bags are required to be capable of fully protecting an occupant from a shock when an accident occurs.

To meet this requirement, a woven fabric for producing the air bag is required to have the following performances.

(1) In the initial opening and expanding (inflating) stage of the air bag made from the woven fabric, no local stress is created on the air bag.

(2) In a final inflated form of the air bag, the amount of energy capable of being absorbed by the air bag when an crash occurs is large.

(3) In the final inflated form, the air bag exhibit a uniform air permeability and the largest resistance to inner pressure of the air bag when it is inflated is constant.

A typical woven fabric for the conventional air bags is disclosed in Canadian Patent No. 974745. This woven fabric is produced by heat-shrinking a gray nylon woven fabric by using a tenter under no tension and thus exhibits a tensile strength of 400 pounds/2.5 cm (about 181 kg/2.5 cm) or more measured by a grab method both in the warp and weft directions of the woven fabric and a low air permeability of 160 cfm or less measured under a pressure of 5 pounds/inch$^2$ (about 7.1 liters/dm$^2$/min or less under a pressure of about 500 Pa).

Also, Japanese Unexamined Patent Publication (Kokai) No. 3-139245 discloses a non-coated nylon fabric for air bags. This woven fabric has been produced by scouring a gray woven fabric and heat-treating the second woven fabric, and thus exhibits a tensile strength of 2,900 N/5 cm (about 178 kg/3 cm) both in the warp and weft directions of the woven fabric and a low air permeability of 10 liters/dm$^2$/min under a pressure of 500 Pa.

The above-mentioned prior art publications does not mention the above-mentioned requirements (1), (2) and (3) for the air bag woven fabric and therefore does not teach or suggest means for satisfying the requirements.

Further, Japanese Unexamined Patent Publication (Kokai) No. 4-214,437 discloses a polyester woven fabric for air bags. The woven fabric is not processed through a scouring and a heat treatment and exhibits, even where the basis weight thereof is 200 g/m$^2$ or less, a tensile strength of 220 daN/5 cm (about 135 kg/3 cm) or more and an ultimate elongation of 25% or more.

Further, U.S. Pat. No. 4,977,016 corresponding to Japanese Unexamined Patent Publication (Kokai) No. 4-2,835 discloses a polyester woven fabric for air bags, having a tensile strength of 1334 N/inch (161 kg/3 cm) or more and an ultimate elongation of 25% or more.

Furthermore, EP-A1-0442,373 specification discloses polyester woven fabrics. The woven fabrics are not processed through scouring and a heat-treatment, and exhibit an ultimate elongation (tensile elongation at break) of 25% or more and an air permeability of 4.7 to 9.4 liter/dm$^2$/min under a pressure of 50 mm Aq. However, the ultimate elongations of the woven fabrics in the weft direction thereof are all less than 30% and the EP specification is completely silent as to the uniformity of the fabrics throughout the fabrics. The woven fabrics in the gray state are subjected to much stress and strain created during the weaving procedure and remaining in the fabrics, and thus are generally not appropriate as woven fabrics for air bags.

Namely, the above-mentioned prior arts contain no mention of the above-mentioned requirements (1) to (3) and thus are quite silent as to a means for satisfying the requirements. Nevertheless, recently air bags having very high burst strength are strongly demanded.

Particularly, for light weight and compact air bags which are recently making rapid progress, the requirement of the high burst strength is assuming greater and greater importance.

DISCLOSURE OF THE INVENTION

An object of the present invention is to provide a woven fabric useful for high performance air bags which can be smoothly inflated in the initial stage of inflation, has a high tensile toughness and a high burst strength and which thus exhibits a high degree of safety, and a process for producing the same.

Another object of the present invention is to provide a woven fabric useful for high performance air bags, which has a uniform air permeability throughout the fabric, in addition to the high initial smooth inflating property and the high burst strength, and thus exhibits an enhanced safety, and a process for producing the same.

The above-mentioned objects can be attained by the woven fabric of the present invention for high performance air bags, which comprises polyester filament warp and weft yarns and satisfying all the requirements that:

(A) in at least one of the stress-strain curves of the woven fabric in the warp and weft directions thereof, where the tensile elongation $\epsilon$ in units of % of the woven fabric is in the range of:

$$1\% \leq \epsilon \leq 20\%,$$

a derivation of the second order $S''(\epsilon)$ of the tensile strength $S(\epsilon)$ in units of kg/3 cm, which is a derived function of high order from tensile elongation $\epsilon$, is substantially positive, (B) where the tensile elongation ($\epsilon$) of the woven fabric is in the range of:

$$\epsilon \leq 10\%,$$

the tensile strength $S(\epsilon)$ of the woven fabric is 10 to 100 kg/3 cm in each of the warp and weft directions thereof; and (C) in each of the graphs showing the stress-strain curves of the woven fabric in the warp and weft directions thereof, where a tensile toughness of the woven fabric in each of the warp and weft directions thereof is represented by an area of a region defined by the stress-strain curve and a transverse straight line corresponding to a stress of zero and drawn in parallel to the axis of abscissas of each graph, the woven fabric has a tensile toughness of 2000 to 4000 kg.%/3 cm in each of the warp and weft directions thereof.

BEST MODE OF CARRYING OUT THE INVENTION

The characteristic properties (A) through (C) which are provided by the woven fabric of the present invention for air bags to attain the objects of the present invention will be explained in detail below referring to the attached drawings.

In each of the graphs shown in FIGS. 1A to 3B, the axis of ordinates represents a tensile strength $S(\epsilon)$ in units of kg/3 cm and the axis of abscissas represents a tensile elongation $\epsilon$ in units of %.

Figure 1A:
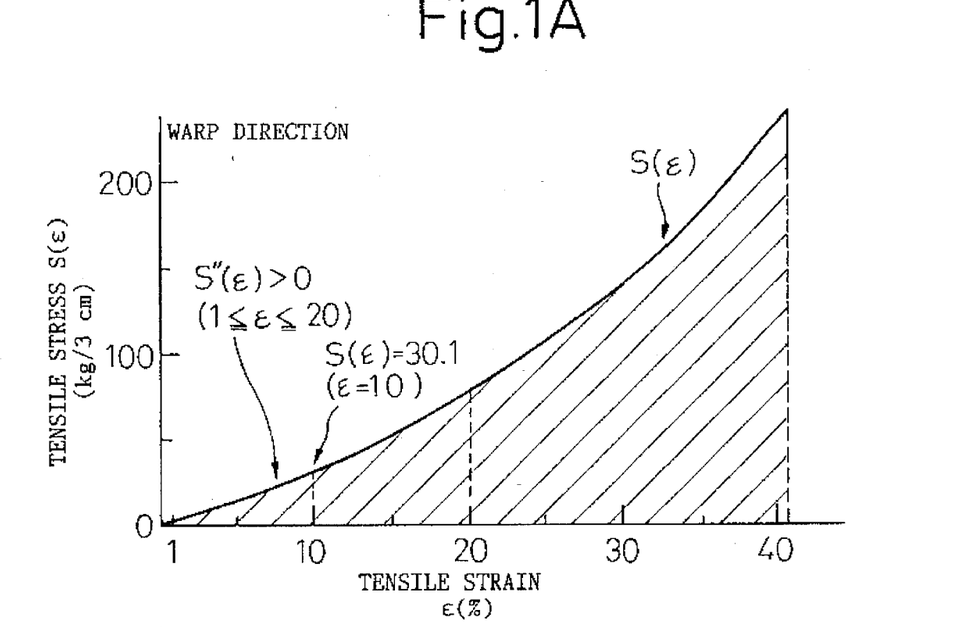
FIGS. 1A and 1B are graphs showing stress-strain curves of a polyester woven fabric produced in Example 1 in accordance with the present invention in the warp and weft directions thereof, respectively.
Figure 1B:
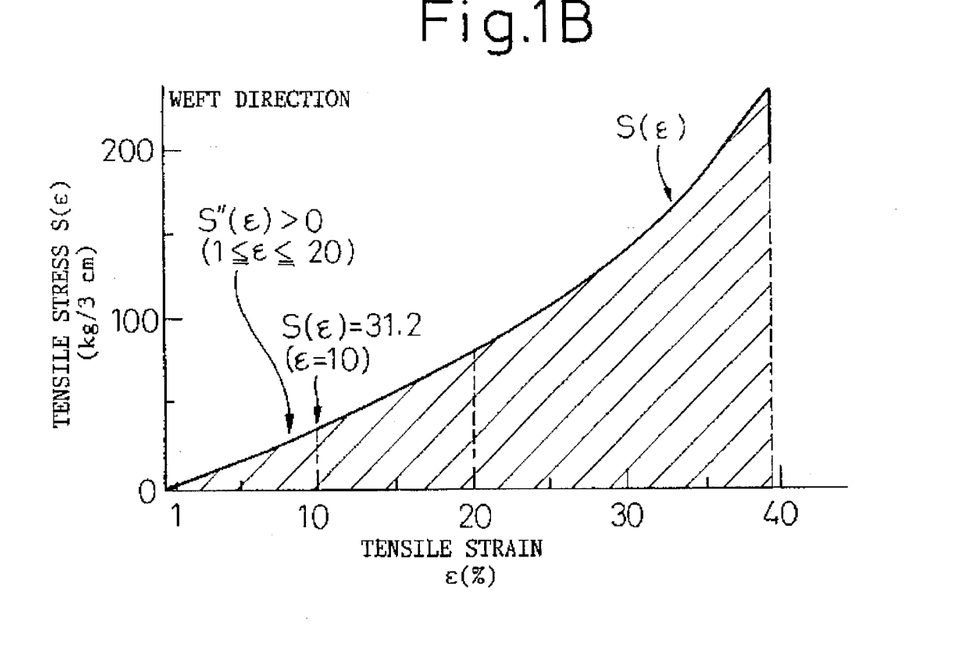

In FIGS. 1A and 1B, it is shown that where the elongation $\epsilon$ is within the range:

$$1\% \leq \epsilon \leq 20\%,$$

the derivation of the second order $S''(\epsilon)$ of the tensile strength is substantially positive in each of the warp and weft directions and where the elongation $\epsilon$ is in the range:

$$\epsilon \leq 10\%,$$

the tensile strength $S(\epsilon)$ is in the range of 10 to 100 kg/3 cm.

Figure 2A:
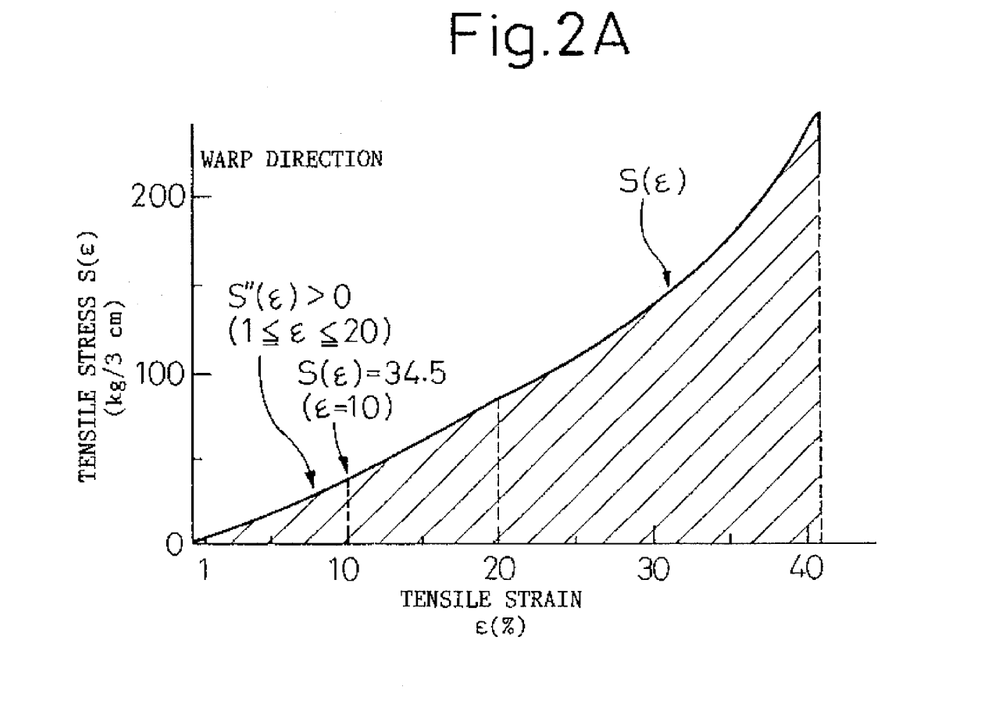
FIGS. 2A and 2B are graphs showing stress-strain curves of a polyester woven fabric produced in Example 2 in accordance with the present invention in the warp and weft directions thereof, respectively.
Figure 2B:
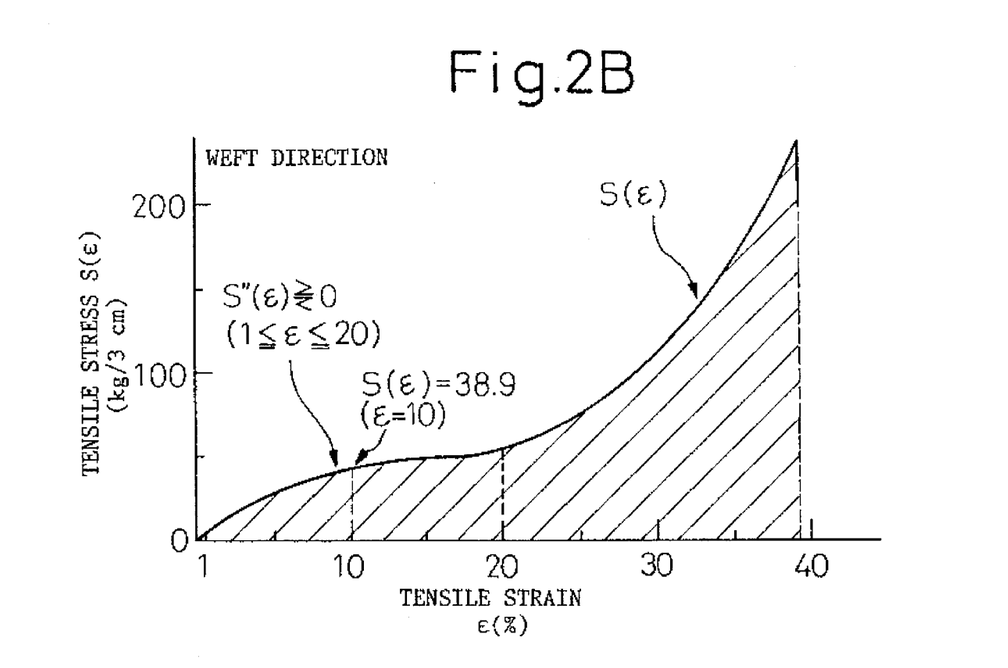

In FIGS. 2A and 2B, it is indicated that where the elongation $\epsilon$ is in the range:

$$1\% \leq \epsilon \leq 20\%,$$

the derivation of the second order $S''(\epsilon)$ of tensile strength is substantially positive only in the warp direction, and where the elongation $\epsilon$ is in the range:

$$\epsilon \leq 10\%,$$

the tensile strength $\epsilon(a)$ is in the range of from 10 to 100 kg/3 cm in each of the warp and weft directions.

Figure 3A:
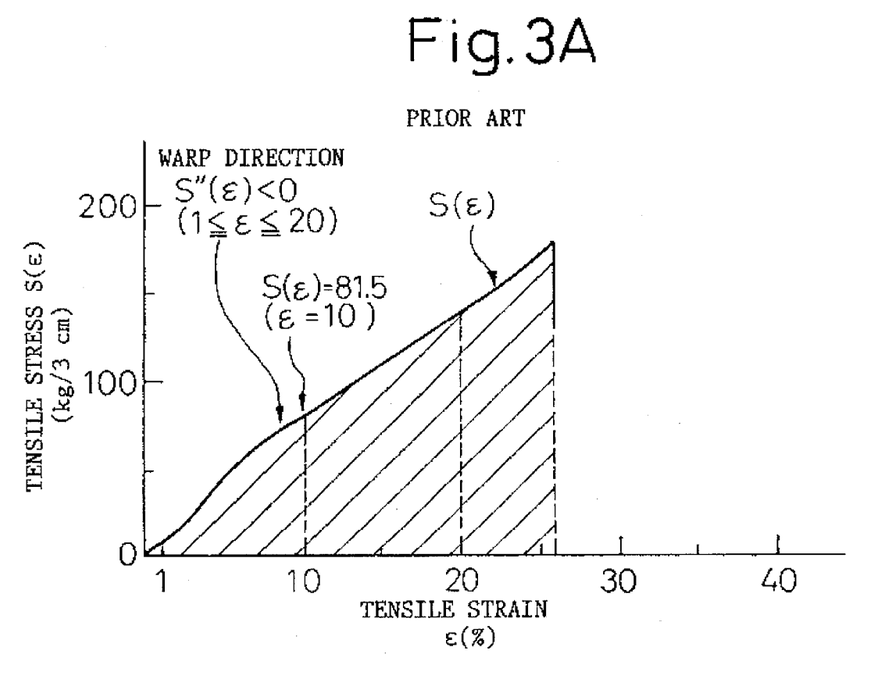
FIGS. 3A and 3B are graphs showing stress-strain curves of a conventional polyester woven fabric (Comparative Example 1) in the warp and weft directions thereof, respectively.
Figure 3B:
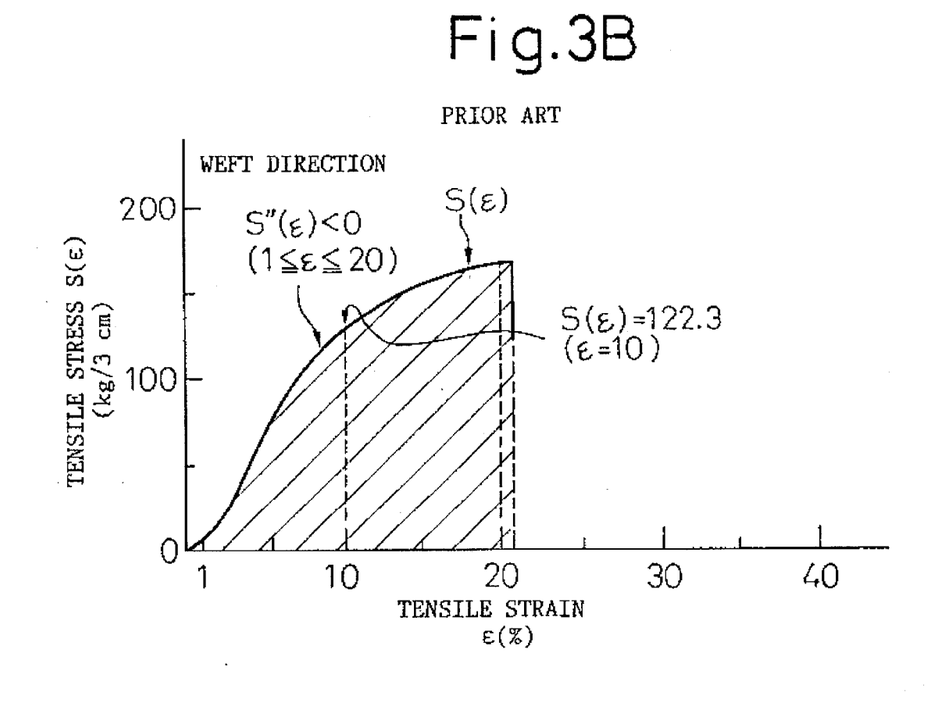

In FIGS. 3A and 3B, it is shown that where the elongation ($\epsilon$) is within the range:

$$1\% \leq \epsilon \leq 20\%,$$

the derivation of the second order $S''(\epsilon)$ of tensile strength is substantially negative in each of the warp and weft directions, and where the elongation $\epsilon$ is in the range: $\epsilon=10\%$, the tensile strength $S(\epsilon)$ in the weft direction is more than 100 kg/3 cm.

Characteristic (A)

The derivation of the second order $S''(\epsilon)$ of the tensile strength $S(\epsilon)$ is a twice differentiated function of the tensile strength $S(\epsilon)$. The fact that $S''(\epsilon)$ is substantially positive, shows that the $S(\epsilon)$ is represented by a curve substantially convex downward as shown in FIGS. 1A or 1B. Namely, in the woven fabric of the present invention for air bags, where the elongation $\epsilon$ is within the range of $1\% \leq \epsilon \leq 20\%$, the stress-strain curve in at least one of the warp and weft directions thereof must be substantially convex downward. The term "substantially positive" means that a stress-strain curve close to a straight line is included in the characteristic (A). The inventors of the present invention made clear that generally, the burst strength of the air bags closely depends on the behavior of the air bags in the initial stage of the inflation, and the initial inflation behavior corresponds to the form of an initial portion of the stress-strain curves. Before the present invention, to enhance the burst strength of the air bags, it was attempted to enhance only the tensile strength and ultimate elongation at break of the woven fabric. However, the inventors of the present invention minutely observed the bursting behavior of air bags, and as results, it was found that in the initial stage of inflation of an individual air bag, which is before the inner pressure of the air bag reaches its maximum, and during which the air bag rapidly expands from a folded state, a high temperature high pressure gas straightly blown from an inflator into the air bag created excessive local tensions directed to portions of the air bag which did not smoothly expand, and whereby portions of the warp and weft yarns of the woven fabric located in the air bag portions around the inflator and on circumferential seam lines are irregularly slipped from each other, and the slipped portions serves as starting points for burst of the air bag.

Namely, the inventors of the present invention found that the burst strength of the air bag can be enhanced by preventing formation of small starting points for bursts during the initial stage of expansion of the air bag. To prevent the formation of the small starting points of burst, it is necessary that the air bag can be uniformly opened in both the warp and weft directions thereof without producing excessive local tensions in the initial stage of the expansion, and that the air bag have initial tensile elongations in both the warp and weft directions sufficient to fully absorb the excessively large expanding tensions applied to the air bag in the initial stage of inflation.

The derivation of the second order $S''(\epsilon)$ of the tensile strength $S(\epsilon)$ is an important factor in estimating whether the initial expansion of the air bag can be smoothly carried out. If the elongation $\epsilon$ is in the range: $1\% \leq \epsilon \leq 20\%$, and where in each of the warp and weft directions, the value of $S''(\epsilon)$ is negative or shifts from positive to zero or to negative, or from negative to zero or to positive, the stress-strain curve of the woven fabric in each of the warp and weft directions thereof includes a portion substantially convex upward, as shown in FIGS. 3A and 3B. In this case, in the initial stage of expansion of the air bag, namely when the air bag is opened and expanded, large stresses are produced in both the warp and weft directions and these stresses cause starting points of burst of the air bag to be created.

Compared with this case, in the case as shown in, for example, FIGS. 2A and 2B, the value of $S''(\epsilon)$ is substantially positive in at least one of the warp and weft directions, the stress produced on the air bag is small in relation to the initial tensile elongation of the air bag, no local excessive stress is produced, and no starting points for bursts are formed.

The value of $S''(\epsilon)$ is preferably positive in both the warp and weft directions.

The tensile strength $S(\epsilon)$ of the woven fabric of the present invention satisfies the following equation:

$$S(\epsilon)=a_1\epsilon^{2n+1}+a_2\epsilon^{2n}+a_3\epsilon^{2n-1}+\ldots+a_{2n+1}\epsilon$$

wherein $S(\epsilon)$ represents a tensile strength (kg/3 cm) of the fabric, $\epsilon$ represents an elongation of the fabric (%) in the range of: $1\% \leq \epsilon \leq 20\%$, $a_1, a_2 \ldots a_{2n+1}$ respectively represent a positive number (>0); and n represents an integer of 1 or more.

Characteristic (B)

In the woven fabric of the present invention for air bags, where the elongation $\epsilon$ is in the range: $\epsilon \leq 10\%$, the tensile strengths $S(\epsilon)$ of the woven fabric in both the warp and weft directions are 10 to 100 kg/3 cm. To prevent formation of starting points for bursts, it is necessary that the air bag fabric be opened and expanded while being uniformly elongated in both the warp and weft directions in the initial stage of inflation. For this need, in the initial elongation of 10% or less, the tensile strength $S(\epsilon)$ must be within a specific range in both the warp and weft directions.

If the tensile strength $S(\epsilon)$ in the above-mentioned elongation range is less than 10 kg/3 cm, the woven fabric is excessively elongated and thus the starting points of burst are easily formed. Also, in this case, a sufficient inner pressure of the air bag cannot be fully produced at the necessary stage of inflation. Otherwise, if the tensile strength $S(\epsilon)$ is more than 10 kg/3 cm, an excessively large stress is applied to the air bag and the inner pressure of the air bag becomes too high, and the burst-starting points are easily formed. In the elongation $\epsilon$ in the range of $\epsilon \leq 10\%$, the tensile strength $S(\epsilon)$ is preferably in the range of 20 to 80 kg/3 cm in both the warp and weft directions.

Characteristic (C)

In the present invention, the term "tensile toughness" is represented by a value obtained in such a manner that in a graph showing a stress-strain curve of a woven fabric in each of the warp direction and the weft direction of the fabric (which may be mentioned as the warp and weft directions) as shown in, for example, FIG. 1, the stress values on the stress-strain curve are integrated with respect to the strain from an elongation corresponding to 1% of full scale of load, namely an elongation under an initial load to an ultimate elongation at break. Concretely, in each of FIGS. 1A to 3B, an area of the hatched region between the stress-strain curve from an elongation of zero to the ultimate elongation at break and an axis of abscissas, drawn through a stress of zero. The tensile toughness exhibits an amount of energy capable of being absorbed by the woven fabric in the form of an inflated air bag upon crushing. The higher the tensile toughness of the woven fabric, the higher the burst strength of the resultant air bag. If the tensile toughness of the woven fabric in each of the warp and weft directions thereof is less than 2,000 kg.%/3 cm, the burst strength of the fabric is unsatisfactory and thus the resultant air bag cannot attain the purpose for which the air bag is used. Also, if the tensile toughness of the woven fabric in each of the warp and weft directions thereof is more than 4,000 kg.%/3 cm, the resultant air bag becomes disadvantageous in that the basis weight and thickness become too high and thus the compactness is decreased, and the fuel expense of car increases. Preferably the tensile toughness of the fabric is 2,100 to 3,900 kg.%/3 cm more preferably 2,200 to 3,800 kg.%/3 cm in both the warp and weft directions thereof.

The woven fabric of the present invention having the characteristics (A) to (C) exhibits an excellent initial opening and expanding property and is useful for air bags having a significantly enhanced burst strength.

The woven fabric of the present invention for air bags preferably has a ratio $P_R/P_M$ in the range of from 0.01 to 0.60, in which ratio $P_R/P_M$, where air permeabilities in units of liter/dm²/min of the woven fabric are measured under a pressure of 500 Pa at 100 points located in the intersections of 10 lines drawn on the woven fabric in parallel to the longitudinal axis of the woven fabric at predetermined intervals with 10 lines drawn on the woven fabric at right angles to the longitudinal axis of the woven fabric at intervals of about one meter, $P_R$ represents the difference in air permeabilities between the largest and the smallest of the measured air permeabilities, and $P_M$ represents an average of all the air permeabilities measured at the 100 points. If the ratio $P_R/P_M$ is less than 0.01, the $P_M$ value is large relative to the $P_R$ value, and thus the resultant air bag exhibits too high an air permeability and thus is disadvantageous. Also, if the ratio $P_R/P_M$ is more than 0.60, the air permeability of the resultant air bag becomes uneven and is variable depending on the cut portions of the woven fabric from which the air bag is made, and thus it becomes impossible to make air bags having the desired uniform air permeability from the woven fabric. Preferably the $P_R/P_M$ ratio is from 0.02 to 0.58, more preferably from 0.03 to 0.55. Further, where an air bag is made from the woven fabric of the present invention by cutting the woven fabric into two circular pieces having a diameter of about 700 mm, superimposing the circular pieces on each other, and seam-joining the superimposed pieces at circumferential portions thereof to form a circular seam line having a diameter of 670 mm with double chain stitches, and bursted by blowing 40 liters of high pressure air having a pressure of 30 kg/cm² in an instant into the air bag within a time of 100 m sec from the blowing, the resultant air bag preferably exhibits a burst strength represented by an inner pressure of the air bag upon bursting, of 4.0 to 10.0 kg/cm²G.

The burst strength in units of kg/cm²G/kg/m² is a burst strength in units of kg/cm²G per basis weight of the woven fabric in units of kg/m². If the burst strength is less than 4.0 kg/cm²G/kg/m², the resultant air bag has a high risk of bursting and being damaged upon a collision of the car and thus it is very dangerous. Also, if the burst strength is more than 10.0 kg/cm²G/kg/m², since the woven fabric has too large a basis weight and thickness, the resultant air bag exhibits a poor compactness and reduces the fuel economy of the car. More preferably the woven fabric of the present invention for air bags has a burst strength of 4.2 to 9.8 kg/cm²G/kg/cm².

If the woven fabric of the present invention for air bags is cut into 200 circular pieces having a diameter of about 700 mm, every two pieces of them are superimposed and are seam-joined at circumferential portions thereof with double row stitches to form a circular seam line having a diameter of 670 mm, to provide 100 air bags, the resultant 100 air bags are subjected to measurement of air permeability by blowing air into the air bags under a pressure of 980 Pa, and the difference in air permeability $P_R'$ between the largest and the smallest of the measured air permeability values and an average $P_M'$ of all the measured air permeability values are determined, the ratio $P_R'/P_M'$ is preferably from 0.01 to 0.50.

The air bag produced from the woven fabric as mentioned above can exhibit a uniform air permeability, and thus a stable inner pressure. In this case, $P_R'$ represents the difference in air permeability between the largest and the smallest of the air permeabilities of the 100 air bags, and $P_M'$ represents an average of the air permeabilities of 100 air bags. The ratio $P_R'/P_M'$ is more preferably from 0.02 to 0.48, still more preferably from 0.03 to 0.45.

The woven fabric of the present invention for air bags preferably exhibits a seam slippage value of 0.1 to 1.0 mm determined under a load of 120 kg/5 cm applied to the woven fabric in the warp or weft direction of the woven fabric. If the seam slippage value in the warp or weft direction is less than 0.1 mm, the resultant woven fabric is too rigid and thus the resultant air bag exhibits a decreased compactability and if the occupant's face collides with the air bag, an occupant's face may be injured. Also, if the seam slippage value in the warp or weft direction is more than 1.0 mm, an inflation gas may pass through the slipped seam holes and the air bag may be perforated or burst. More preferably, the seam slippage value is from 0.15 to 0.8 mm.

In the polyester woven fabric of the present invention, cover factors thereof in the warp and weft directions are preferably 1,000 to 1,280. The "cover factor in warp direction" is a product of a square root of a thickness of the warp yarns of the woven fabric with a weave density (yarn number/inch) of the warp yarns of the woven fabric. Also, the "cover factor in the weft yarn" is a product of a square root of a thickness of the weft yarns of the woven fabric with a weave density (yarn number/inch) of the weft yarns.

When the cover factor in the warp or weft direction is less than 1,000, the resultant woven fabric has too low a weave density for air bags, and thus when the resultant air bag is inflated, seam-slippages may occur and the air bag may exhibit a reduced burst strength. Also, when the cover factor in the warp or weft direction is more than 1,280, the resultant woven fabric is too stiff and the resultant air bag is difficult to store in an air bag module.

In the woven fabric of the present invention for air bags, the cover factors thereof are more preferably 1,050 to 1,230 in both the warp and weft directions of the woven fabric.

Preferably, the polyester woven fabric of the present invention exhibits an air permeability of 0.2 to 9.5 liters/dm$^2$/min under a pressure of 500 Pa. If the air permeability under the pressure of 500 Pa is less than 0.2 liter/dm$^2$/min, the resultant woven fabric is too stiff and thus the occupant's face may be injured by the air bag. Also, if the air permeability under the pressure of 500 Pa is more than 9.5 liters/dm$^2$/min, since an inflation gas can easily pass through the resultant air bag, the occupant may be burnt or the occupant's eyes may be injured. The air permeability of the woven fabric of the present invention under a pressure of 500 Pa is more preferably 0.3 to 0.9 liter/dm$^2$/min.

The woven fabric of the present invention preferably has a weave structure of a 1/1 type plain weave or 2/2 type mat weave. The woven fabric may have a 2/1 or 2/2 type twill weave structure or a ripstop weave structure. Also, the woven fabric may have a plain/mock leno weave structure usable for filter cloths. Nevertheless, the weave structure most suitable for realizing an air bag having a satisfactory light weight and compactness and an excellent burst strength is the 1/1 type plain weave structure.

The polyester woven fabric of the present invention is optionally calendered. The calendered woven fabric has an enhanced surface smoothness, and thus the occupant's face can be protected from injury upon colliding the face. Also, the calendering reduces the thickness of the woven fabric, and the resultant air bag has an increased compactness.

Figure 4:
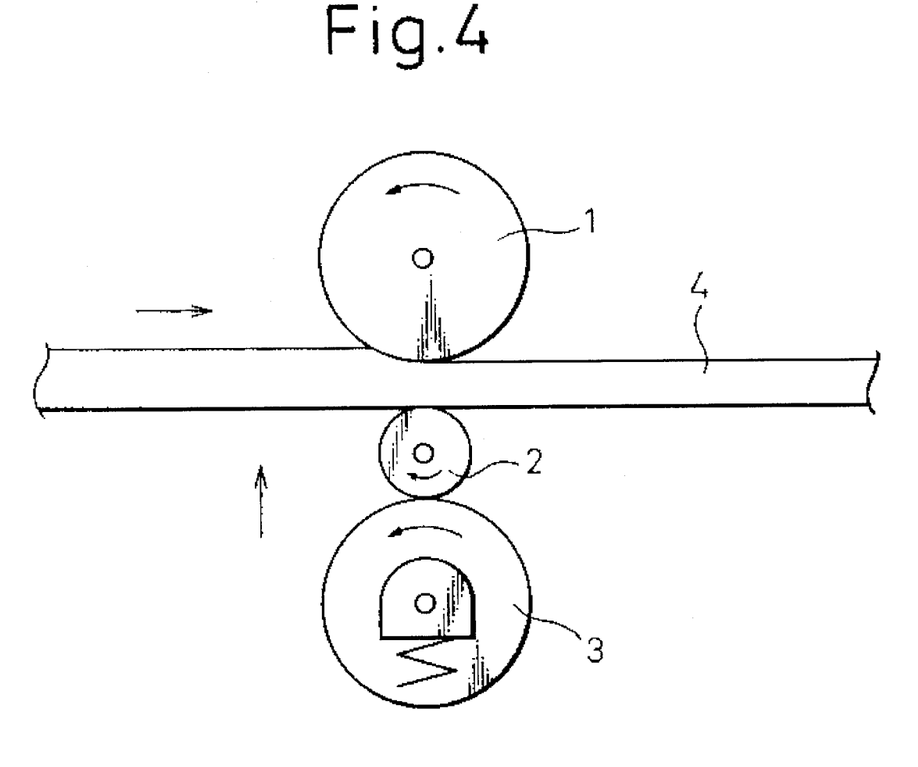
FIG. 4 shows a model of a calendering means usable in the process of the present invention.

The calender machine for the woven fabric for air bags may be selected from conventional calender machines, for example, one as shown in FIG. 4.

The calendering procedure is preferably carried out at a temperature of from 180° C. to 220° C. under a pressure of 50 to 150 tons at a speed of 4 to 50 m/min. The calendering may be applied to only one surface of the fabric or both the surfaces of the fabric.

In FIG. 4, the calender is provided with a heating roller (calender roller) 1, a cushion roller 2 and pressing roller 3, and a gray woven fabric or scoured woven fabric 4 is fed to the calender.

The woven fabric 4 is fed by feeding rollers (not shown in FIG. 4) into the calender in the direction shown by an arrow, passes between the heating roller 1 and a cushion roller 2 while being calendered, and then is delivered through delivering rollers (not shown). In this type of calender, the heating roller 1 is arranged in a fixed position and pressed upward (as shown by an arrow) through the woven fabric 4 by the cushion roller 2. The cushion roller 2 is pressed upward by the pressing roller 3.

To the polyester filament woven fabric of the present invention, a coating procedure is optionally applied. For this coating procedure, silicone rubbers and chloroprene rubbers are preferably used. The silicone rubbers have an excellent heat resistance and application property and thus are preferable for coating the woven fabric of the present invention. For the coating procedure, a knife coating machine or comma coating machine may be utilized. Also, when the coating procedure is applied to a calendered woven fabric, a sufficient effect can be obtained even with a reduced amount of the coating material, which is more preferable.

The polyester woven fabric of the present invention is produced by the process comprising the steps of:

weaving warp and weft yarns consisting of untwisted polyester filament yarns, to provide a gray weave having a tensile toughness of 1,000 kg.%/3 cm or more but less than 2,000 kg.%/3 cm in each of the warp and weft directions of the gray weave; and applying a shrinkage-setting treatment to the gray weave without or after applying a scouring treatment thereto, the shrinkage-setting treatment being controlled to an extent such that an increase in each of the warp and weft densities of the gray weave or the scoured weave is 5 to 25% and an increase in tensile elongation at break of the weave in each of the warp and weft directions thereof is 70 to 250%.

The above-mentioned polyester filament yarns preferably have a tensile elongation at break of 9 to 18%. If the tensile elongation at break is less than 9%, the resultant woven fabric may have an unsatisfactory tensile toughness even after the shrinkage-setting procedure is applied. Also, if the tensile elongation at break is more than 18%, the resultant woven fabric may exhibit an insufficient dry shrinkage and thus it may become difficult to control the air permeability of the woven fabric under a pressure of 500 Pa to from 0.2 to 9.5 liters/dm$^2$/min. More preferably, the tensile elongation at break of the polyester filament yarns is from 10 to 17%.

Further, the polyester filament yarns preferably have a dry shrinkage of 3 to 13% at a temperature of 150° C. If the dry shrinkage is less than 3%, the resultant woven fabric exhibits a poor shrinkage and thus it may be difficult to control the air permeability of the woven fabric under a pressure of 500 Pa to 0.2 to 9.5 liters/dm$^2$/min. Also, as a result, the resultant woven fabric may exhibit a reduced tensile toughness.

Also, if the dry shrinkage is more than 13%, the resultant woven fabric has too large a shrinkage, exhibits too high a stiffness, and thus the resultant air bag has an increased risk of injuring the occupant's face. More preferably, the polyester filament yarns have a dry shrinkage of 3.5 to 12%.

The warp and weft yarns for forming the woven fabric of the present invention preferably have a thickness of individual filaments (dpf) of 1.0 to 2.5 de. If the individual filament thickness is less than 1.0 de, the weaving procedure may be difficult, and thus the resultant woven fabric may have an unsatisfactory tensile toughness. Also, if the individual filament thickness is more than 2.5 de, the resultant woven fabric may be too stiff and thus the resultant air bag may have an unsatisfactory compactness and an increased risk of injuring the occupant's face upon colliding. Also, it may become difficult to control the air permeability of the woven fabric under a pressure of 500 Pa to a level of from 0.2 to 9.5 liters/dm$^2$/min.

More preferably, the individual filament thickness is from 1.2 to 2.3 de.

Further, the total thickness of the polyester filament yarns, namely, the yarn thickness, is preferably 200 to 500 de. If the yarn thickness is less than 200 de, the resultant air bag may exhibit an unsatisfactory burst strength. Also, if it is more than 500 de, the obtained woven fabric has an increased basis weight, and the resultant air bag may have an unsatisfactory lightness and compactness. More preferably, the yarn thickness is from 250 to 450 de. The polyester filament yarns usable for the present invention are preferably untwisted yarns. If twisted, the resultant yarns exhibit a reduced slipping property over each other, and thus in the shrinkage-setting procedure, the woven fabric may be unable to fully shrink, and the resultant woven fabric may exhibit an unsatisfactory tensile toughness. Preferably, the polyester filament yarns have a tensile strength of 9.0 to 13.0 g/de. If the tensile strength is less than 9.0 g/de, the resultant woven fabric may exhibit a reduced tensile toughness, and the resultant air bag may exhibit an unsatisfactory burst strength. If the tensile strength is more than 13.0 g/de, the resultant polyester filament yarns may have a reduced uniformity and thus the resultant air bag may exhibit an unsatisfactory burst strength. More preferably, the tensile strength of the polyester filament yarns is from 9.0 to 12.0 g/de.

The polyester usable for forming the polyester filament yarns for the present invention is preferably selected from polyester homopolymers, for example, polyethylene terephthalate, polybutylene terephthalate, polyhexylene terephthalate, polyethylene naphthalate, polybutylene naphthalate, polyethylene-1,2-bis(phenoxy) ethane-4,4'-dicarboxylate, and polyester copolymers of, for example, polyethylene isophthalate, polybutylene terephthalate or naphthalate, and polybutylene terephthalate or decanedicarboxylate. Particularly, polyethylene terephthalate, which has appropriately balanced mechanical properties and fiber-formability, is most preferably employed for the present invention.

The above-mentioned polyester filament yarns preferably have an intrinsic viscosity of 0.80 to 0.95 dl/g. If the intrinsic viscosity is less than 0.80 dl/g, the resultant filament yarns may have a reduced tensile strength and thus the resultant woven fabric may have a reduced mechanical strength. Also, if the intrinsic viscosity is more than 0.95 dl/g, the polymer may exhibit a decreased filament-forming property, and the resultant filament yarns may have a degraded quality and the resultant woven fabric may have a decreased uniformity in the performance thereof. More preferably, the intrinsic viscosity is from 0.82 to 0.90 dl/g.

In the process of the present invention, the gray woven fabrics for air bags preferably have a tensile toughness of 1.000 kg.%/3 cm or more but less than 2,000 kg.%/3 cm in both the warp and weft directions thereof. If the tensile toughness of the gray woven fabric is less than 1,000 kg.%/3 cm in each of the warp and weft directions of the woven fabric, after the shrinkage-setting procedure is applied, the resultant gray or scoured woven fabric may exhibit an unsatisfactory toughness. If the tensile toughness of the gray woven fabric is 2,000 kg.%/3 cm or more, the resultant gray or scoured woven fabric may be too stiff, and may exhibit an excessively high rigidity and the dry shrinkage of the woven fabric may become more difficult. More preferable tensile toughness of the gray woven fabric is 1,020 to 1,950 kg.%/3 cm in both the warp and weft directions thereof.

Further, in the present invention for air bags, it is preferable that the weaving procedure be carried out so that the cover factors of the gray woven fabric in both the warp and weft directions are adjusted to between 800 and 1,150. The cover factor in the warp or weft direction is a product of a square root of the yarn thickness in units of denier of the polyester filament yarns with the weave density in units of yarn number/inch of the warp or weft yarns. If the cover factor of the gray woven fabric in the warp or weft direction is less than 800, the tensile elongation of the woven fabric cannot be fully increased even by applying the shrinkage-setting procedure to the woven fabric, and the resultant air bag may exhibit an unsatisfactory burst strength. More preferably, the cover factors of the gray woven fabric in both the warp and weft directions are from 830 to 1,100.

In the weaving procedure, it is preferred that a difference in cover factor of the gray fabric between the warp and weft direction be controlled to 5 to 100. If the difference in the cover factor between the warp and weft directions is less than 5, the weave-processability is low and a production of a uniform woven fabric is difficult. Also, if the difference is more than 100, stress is concentrated on the warp or weft yarns, and thus the resultant air bag exhibits an unsatisfactory burst strength. More preferably, the difference in cover factor between the warp and weft directions is 10 to 95. The cover factor in one of the warp and weft direction may be larger than that in the other direction. Nevertheless, to enhance the weave processability, it is preferable that the cover factor in the warp direction be 5 to 100 larger than that in the weft direction.

The shrinkage-setting procedure is preferably carried out in such a manner that substantially no tension is applied to the woven fabric in the weft direction and the woven fabric is loaded under a tension of 10 to 500 g/cm in the warp direction only. The above-mentioned tension value is slightly lower than a thermal shrinking force created on the woven fabric in the warp direction at a surface temperature of a heating roller, when the woven fabric is completely heat-treated in the warp direction. If the tension applied to the woven fabric in the warp direction is less than 10 g/cm, the woven fabric cannot uniformly shrink and thus the resultant woven fabric may exhibit uneven tensile toughness. Also, if the tension is more than 500 g/cm, the resultant shrinkage-set woven fabric may exhibit an unsatisfactory tensile toughness. More preferably, the tension applied to the woven fabric in the warp direction is from 20 to 490 g/cm.

During the shrinkage-setting treatment, substantially no tension is applied to the woven fabric in the weft direction thereof. However, the woven fabric can be uniformly heat set while being tensed in all the directions due to tensions created by a contact resistance of the woven fabric against the metal surface of a heat-setting machine, and thus while uniformly shrinking in an amount of shrinkage corresponding to the dry shrinkage of the woven fabric.

As a result, a woven fabric having a tensile toughness which is large in all the directions and uniform in the warp and weft directions, and an initial tensile elongation which is high in all the directions and uniform in the warp and weft directions, can be produced.

The shrinkage-setting procedure may be applied to the woven fabric before or after the calendering procedure is applied to the woven fabric.

During the shrinkage-setting procedure, an increase in the density of the woven fabric in the warp or weft direction is controlled to a level of 5 to 25%. If the density increase is less than 5%, the resultant woven fabric may exhibit an unsatisfactory tensile toughness and thus the air bag produced from the woven fabric may exhibit an unsatisfactory burst strength. Also, if the density increase is more than 25%, the resultant woven fabric may have too large a basis weight and thus the resultant air bag produced from the woven fabric may have a decreased compactness. More preferably, the density increase in the warp and weft directions is 7 to 23%.

Also, during the shrinkage-setting procedure, an increase in tensile elongation at break of the woven fabric is preferably controlled to a level of 70 to 250% in each of the warp and weft directions. If the increase in tensile elongation at break of the woven fabric is less than 70%, the resultant woven fabric may exhibit an insufficient tensile toughness and thus the resultant air bag made from the woven fabric may exhibit an unsatisfactory burst strength. Also, if the above-mentioned increase is more than 250%, the resultant woven fabric becomes too stiff and the resultant air bag made from the woven fabric may injure the occupant's face upon inflation and may have a reduced compactness. More preferably, the increase in the tensile elongation at break of the woven fabric after the shrinkage-setting treatment is from 80% to 220%.

The increase in the tensile elongation at break of the woven fabric can be calculated in accordance with the equation (1):

Increase in tensile elongation at break (%)={[tensile elongation (%) at break of woven fabric after shrinkage-setting treatment] −[tensile elongation (%) at break of original polyester filament yarns]/tensile elongation (%) at break of original yarns}×100    (1)

After the weaving procedure, the resultant gray woven fabric is preferably processed by a scouring treatment. However, the scouring treatment may be omitted for the purpose of, for example, reducing the cost. By the scouring treatment, spinning oil and weaving oil can be removed from the woven fabric. Therefore, for the purpose of enhancing the long term reliability and flame retardant property, the scouring treatment is preferably applied to the gray weave.

The gray weave, optionally after the scouring treatment, is subjected to a shrinkage-setting procedure.

Figure 5:
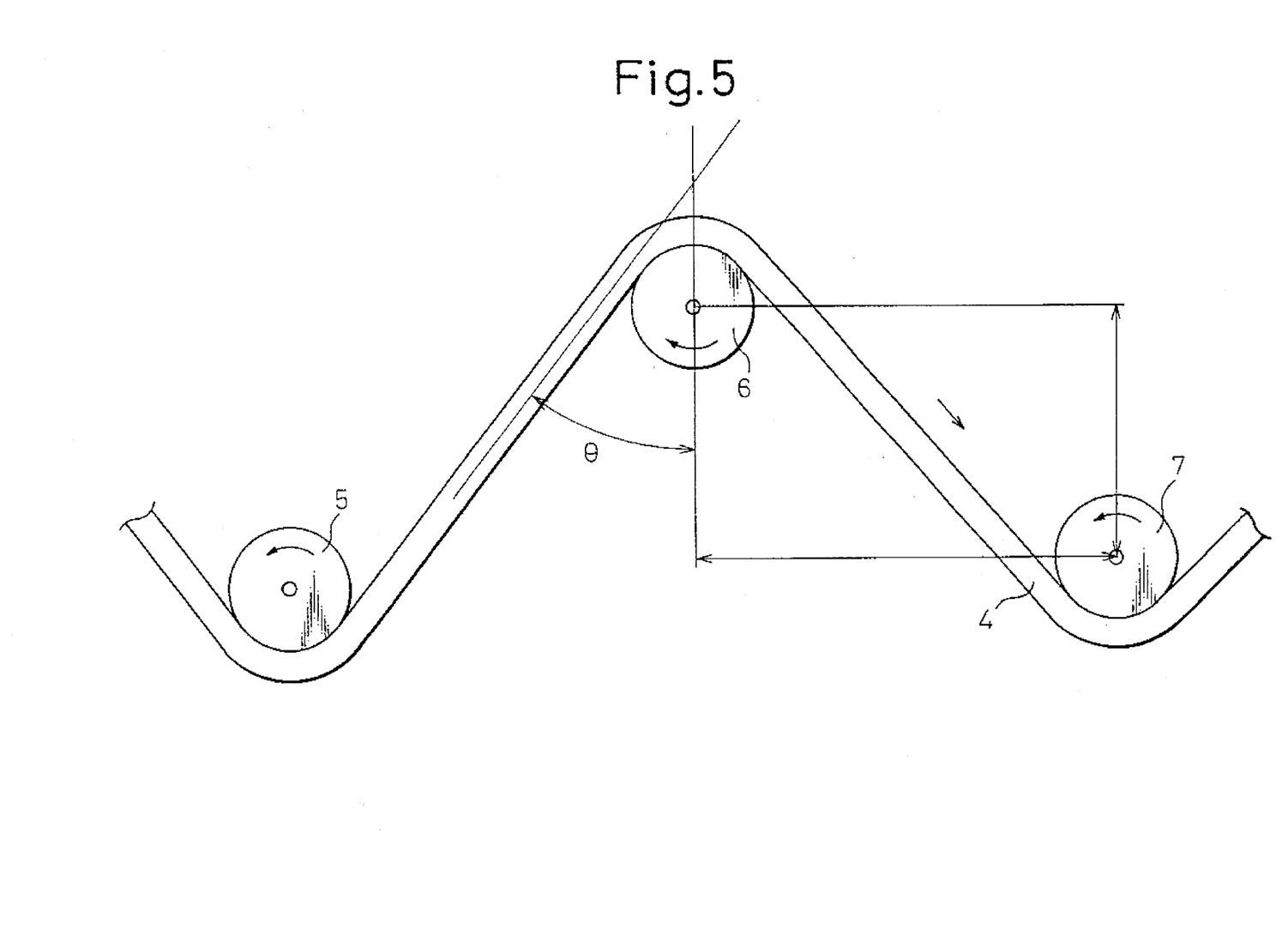
FIG. 5 shows a model of a shrinkage-setting means usable in the process of the present invention.

FIG. 5 briefly shows a shrinkage-setting procedure. In FIG. 5, heating rollers 5, 6 and 7 are successively arranged so as to provide a forwarding path of a woven fabric 4. The peripheral speeds of the rollers are established so as to establish the relationships:

roller 5>roller 6>roller 7

For the shrinkage-setting procedure for the gray or optionally scoured woven fabric, a multistep metal roll-setting machine is used. In the machine, the metal rolls have a substantial surface temperature of 150° to 230° C., and the shrinkage-setting procedure is carried out so as to allow the woven fabric to shrink at a basis shrinkage of 10 to 40%. If the substantial surface temperature of the metal rolls is less than 150° C., the shrinkage-setting cannot be satisfactorily effected, and the resultant woven fabric may exhibit an unsatisfactory tensile strength. Also, if the substantial surface temperature is more than 230° C., the woven fabric may be wrinkled. More preferably, the substantial surface temperature of the metal rolls is 155° C. to 220° C.

The multistep metal roll setting machine is preferably provided with 3 to 30 metal rolls supported at both ends thereof, and each metal roll is driven by a torque motor. If the number of metal rolls is less than 3, the amount of heat imparted to the woven fabric may be insufficient, and thus the woven fabric may not be fully shrinkage-set. Also, if the number of metal rolls is more than 30, the shrinkage-setting effect is saturated, the running cost increases and the economical advantage decreases. More preferably, the number of metal rolls is 4 to 20. The above-mentioned torque motor-type multistep metal roll setting machine can shrinkage-set the woven fabric without grasping both the side edge portions of the woven fabric, and thus can allow the woven fabric to shrink in a large amount and uniformly in the weft direction thereof, while a conventional pin tenter or crip tenter must grasp the side edge portions of the woven fabric.

Also, by driving the metal rolls by using the torque motors, the woven fabric is allowed to uniformly shrink in a large amount under an evenly controlled tension. As a result, it is possible to make the tensile toughness of the resultant woven fabric uniform and high.

In the torque motor type multistep metal roll setting machine, the metal rolls are supported at both the ends thereof and are hollow. High temperature air is blown onto the surfaces of the metal rolls, and all the rolls are contained in a box in which the inner temperature thereof is controlled to a predetermined level so that the surface temperature of the metal rolls is controlled to the predetermined level.

Where the shrinkage-setting procedure by the above-mentioned torque motor type multistep metal roll setting machine is carried out in two stages, namely at a low temperature and a high temperature, it becomes possible to shrink the woven fabric at a large shrinkage and to produce a shrunk woven fabric having a satisfactory tensile toughness. If the shrinkage-setting procedure is carried out while rapidly heating the woven fabric to a high temperature, undesirable wrinkles and uneven shrinkage may occur on the woven fabric. Preferable shrinking temperatures include a low heating temperature of 150° C. to 160° C. at which the woven fabric is slightly shrunk and a high heating temperature of 170° C. to 230° C. at which the woven fabric is fully shrunk and heat-set. More preferably, the shrinkage-setting procedure is carried out in three steps while gradually increasing the heating temperature. However, for the purpose of simplifying the shrinkage-setting procedure, the procedure may be carried out in a single step. The shrinkage-setting procedure is preferably carried out at a speed of 5 to 50 m/min. If the speed is less than 5 m/min, the procedure's cost increases. Also, if the speed is more than 50 m/min, it may become difficult to uniformly shrinkage-set the woven fabric and thus to obtain a shrinkage-set woven fabric having a satisfactory tensile toughness.

By using the torque motor type multistep metal roll setting machine, no irregular tension is applied to either side edge portion of the woven fabric, and thus the side edge portion of the woven fabric can be kept flat, while if a tenter is used, since the side edge portions of the woven fabric are held by a plurality of crips or pins, the flatness of the side edge portions decreases. Also, the side edge portions of the shrinkage-set woven fabric are free from clipping marks or pin perforations, and thus the woven fabric including the side edge portions thereof can be entirely coated. Also, since the flatness is good and the gas permeability is uniform, the coating liquid can uniformly penetrate throughout the woven fabric and the resultant coated woven fabric has a uniform coating. When a calendering procedure is applied, a woven fabric which is free from the cripping marks or pin perforations and thus has a high flatness, can be effectively calendered at a high stability with a high efficiency, without damaging the elastic roll of the calender.

In the shrinkage-setting procedure, preferably, the total contact length of the woven fabric with the metal rolls is 3 to 50 m, and the minimum contact angle of the woven fabric with the metal rolls is 10 to 90 degrees. The total contact length is the sum of the contact lengths of the woven fabric with a plurality of individual metal rolls. If the total contact length is less than 3 m, the amount of heat imparted from the metal rolls to the woven fabric may be insufficient and thus the shrinkage-setting effect on the woven fabric may be insufficient. Also, if the total contact length is more than 50 m, the shrinkage-setting effect may be saturated, and the running cost increases. More preferably, the total contact length is 3.5 to 40 m.

The minimum contact angle refers to a minimum angle θ, as shown in FIG. 5, among the angles formed between normal lines at contact points of the woven fabric with the metal rolls and extensions of the straight line made by the portions of the woven fabric located between the metal rolls and the adjacent metal rolls thereto. If the minimum contact cycle θ is less than 10 degrees, the contact resistance of the woven fabric to the metal roll surfaces may be too high and thus the shrinkage of the woven fabric on the metal rolls may not be fully carried out, and thus resultant shrunk woven fabric may have an unsatisfactory tensile toughness. If the minimum contact angle is more than 90 degrees, the contact resistance of the woven fabric to the metal roll surfaces may be too low, and thus the woven fabric may irregularly and unevenly shrink particularly in the weft direction thereof and the resultant shrunk woven fabric may exhibit uneven tensile toughness. More preferably, the minimum contact angle is from 15 to 85 degrees.

EXAMPLES

The present invention will be further explained by the following examples. In the examples, the physical properties were evaluated by the following methods.

Tensile Elongation ε and Tensile Strength S(ε) of Woven Fabric

These properties were measured in accordance with Japanese Industrial Standard (JIS) L 1096, Tensile test method of woven fabric. The testing woven fabric specimens had a width of 3 cm, and a length of 20 cm, and the measurement was carried out at a tensile rate of 20 cm/min. In the measurement of the tensile elongation, the starting point was a tensile elongation at which a load reached 5 kg which corresponded to 1% of the full scale.

Derivation of the Second Order S"(ε) of Tensile Strength of Woven Fabric

The data of the tensile strength measurement of the woven fabric was analyzed by a minimum involution method by using a computer to define the tensile strength S(ε) as a derived function of high order from the elongation ε, and the derivation of the second order S"(ε) is calculated from the above-mentioned high order derived function.

Tensile Toughness of Woven Fabric

By using the data of the S(ε) obtained by the tensile measurement of the woven fabric, and by using a computer, a area of a region defined between a stress-strain curve of the woven fabric from an elongation at which the load reached 1% of the full scale to an elongation at which the woven fabric was broken, and the abscissa passing through an elongation of zero was calculated by an integration method.

Burst Strength of Air Bag

A woven fabric was cut into two pieces in the form of a true circle having a diameter of 700 mm, the two pieces were superimposed on each other and seam-joined in a circular seam line having a diameter of 670 mm by double row stitches, to provide an air bag. The air bag was burst by blowing 40 liters of a high pressure air having a pressure of 30 kg/cm$^2$ in an instant into the air bag. When the air bag was burst within 100 msec from the blowing of the high pressure air, the maximum inner pressure in the air bag was measured. The burst strength of the air bag was represented by a value in units of kg/cm$^2$G/kg/m$^2$, calculated by dividing the maximum inner pressure in units of kg/cm$^2$G by the basis weight in units of kg/m$^2$ of the woven fabric.

Air Permeability of Woven Fabric

The air permeability of the woven fabric was measured by using an air permeability tester (trademark: GAS PERMEABILITY TESTER FX 3300, made by Textest Co.) having an orifice with a cross-sectional area of 100 cm$^2$ under a differential pressure of 500 Pa.

Ratio $P_R/P_M$ Value of Air Permeability of Woven Fabric

The air permeability of the woven fabric was measured by using the air permeability tester (FX3300, Textest Co.) having an orifice with a cross-sectional area of 100 cm$^2$ under a differential pressure of 500 Pa. On the woven fabric surface, 100 points were set forth in the intersections of 10 lines drawn in parallel to the longitudinal axis of the woven fabric at predetermined intervals with 10 lines drawn at right angles to the longitudinal axis of the woven fabric at intervals of about one meter, and the air permeability (liter/dm$^2$/min under 500 Pa) of the woven fabric was measured at the 100 points. Among the measured air permeability values, a difference between the largest and the smallest was represented by $P_R$, and the average of the air permeability values was represented by $P_M$. The ratio $P_R/P_M$ was calculated by dividing $P_R$ by $P_M$.

Also, an average of air permeabilities of the woven fabric at 10 points located in the center portion of the woven fabric was calculated, and an average of air permeabilities measured at 20 points located in the two side edge portions of the woven fabric was calculated.

Ratio $P_R'/P_M'$ Value of Air Permeability of Air Bag

Two hundred circular woven fabric pieces each having a diameter of 700 mm were prepared. Every two pieces of the 200 circular pieces were seam-joined at a circular seam line having a diameter of 670 mm by double row stitches, to provide 100 beltless air bags for driver seats.

Each air bag was subjected to a measurement of air permeability. The measurement was carried out under an inner pressure of 980 Pa. The ratio $P_R'/P_M'$ was calculated by dividing a difference $P_R'$ between the largest and the smallest of the measured air permeabilities (liter/min) of the 100 air bags by an average $P_M'$ of the measured air permeabilities.

Seam Slippage Value

The seam slippage value of the woven fabric was measured in accordance with JIS L 1096, 6.21.1 Seam Slipping Method. In the measurement, the sewing yarns used were nylon 66 filament yarns with a thickness of 1260 denier. The measurement of the slippage value was carried out by applying a load of 120 kg/5 cm to the seam, removing the load, and one hour after the removal of the load, slipping the sewing yarns under a load of 0.5 kg/5 cm.

Density and Cover Factor of Woven Fabric

The densities of the woven fabric in the warp and weft directions were measured by using a densimeter, and the cover factors of the woven fabric was calculated from the densities and the yarn thicknesses of the woven fabric. For the gray woven fabric, the thickness of original yarns were used, and for the shrinkage-set woven fabric, the thickness of the yarns withdrawn from the woven fabric was measured and utilized.

Tensile Elongation at Break and Tensile Strength at Break of Filament Yarns

These were measured by the tensile test method described in JIS L 1017 (TESTING METHOD FOR CHEMICAL FIVER TIRE CODE). The twist number was 80 turns/m, the testing length was 25 cm, the stretching rate was 30 cm/min.

Dry Heat Shrinkage

The filament yarn in the untwisted state was shrunk at 150° C. for 30 minutes, and the shrinkage was calculated in accordance with the following equation.

$$\text{Dry heat shrinkage} = ((L - L_0)/L) \times 100(\%)$$

wherein L represents a length of the filament yarn before shrinking, and $L_0$ represents a length of the filament yarn after shrinking.

Intrinsic Viscosity

The polyester filament yarns in an amount of 0.6 g were dissolved in 50 ml of o-chlorophenol, the resultant solution was subjected to the measurement of the intrinsic viscosity at a temperature of 35° C.

Example 1

Polyester filament yarns [made by Teijin Ltd.] shown in Table 1 and having a tensile elongation at break of 13.5%, a dry heat shrinkage of 6.5% at a temperature of 150° C. and a yarn count of 420 denier/249 filaments were provided. The polyester filament yarns in the untwisted state were woven into a plain weave shown in Table 2 by a water jet loom. (The cover factors of the gray woven fabric: Warp: 1,086, Weft: 1,045, Difference between warp and weft: 41) The gray woven fabric was scoured and dried, and shrinkage-set by a multistep roll setting machine under the conditions shown in Table 4 while applying a tension to the woven fabric in the warp direction thereof. The resultant polyester woven fabric had a cover factor in the warp direction of 1,231, a cover factor in the weft direction of 1,189, a difference in the cover factor between the warp and weft directions of 42, a basis shrinkage of 22.0%, and an increase in the tensile elongation at break of 202% in the warp direction and of 190% in the weft direction. In the setting machine, the surface temperatures of the metal rolls located in the initial section of the machine were 155° C. and the surface temperature of the other metal rolls located in the final section of the machine was 190° C., and the total setting time in the two steps was about 1.5 minutes.

With respect to the woven fabric prepared by the above-mentioned procedures, the tensile elongation $\epsilon$ was measured, and a stress-strain curve was prepared. (FIGS. 1A and 1B). As seen from FIGS. 1A and 1B, $S''(\epsilon)$ was, where the elongation $\epsilon$ is in the range: $1\% \leq \epsilon \leq 20\%$, substantially positive in both the warp and weft directions, and $S(\epsilon)$ was, where the elongation $\epsilon$ is in the range: $\epsilon \leq 10\%$, 30.1 kg/3 cm or less in the warp direction and 31.2 kg/3 cm or less in the weft direction.

Next, air bags were produced from the woven fabric. When the air bags were subjected to a burst strength measurement, they had a burst strength of 9.2 kg/cm$^2$G/kg/m$^2$ as shown in Table 8, and it was confirmed that the air bags had an excellent burst strength.

Examples 2 to 5 and Comparative Examples 1 to 3

In each of Examples 2 to 5 and Comparative Examples 1 to 3, the polyester filaments yarns indicated in Table 1 were used to produce plain weaves shown in Tables 2 and 3 by the same procedures as in Example 1. The resultant woven fabric was shrinkage-set by using the multistep metal roll type setting procedure (10 rolls were used) or tenter type setting machine at the temperature as shown in Tables 4 and 5, to produce the woven fabric as shown in Tables 6 and 7. Some of the resultant woven fabrics were subjected to a calendering procedure. With respect to the resultant woven fabrics, the tensile elongation $\epsilon$ was measured and stress-strain curves of the fabrics were prepared. The stress-strain curves of Example 2 are shown in FIGS. 2A and 2B, and the stress-strain curves of Comparative Example 1 are shown in FIGS. 3A and 3B.

The physical properties of the woven fabrics and the burst strength of the air bags of Examples 1 to 5 and Comparative Examples 1 to 3 were measured. The results are indicated in Tables 8 and 9.

In Examples 3 and 4, the shrinkage-setting procedure was carried out in a single step at a temperature of 200° C. by using a multistep metal roll type setting machine having 10 rolls. Also, in Comparative Examples 1 to 3, the shrinkage-setting procedure was carried out at a temperature of 200° C. by using a tenter. In these cases, the feed speed of the gray woven fabric was slightly higher than that in Example 1.

TABLE 1

|  |  | Examples | Comparative Example | | |
|---|---|---|---|---|---|
|  |  | 1 to 5 | 1 | 2 | 3 |
| Original filament yarn | Yarn thickness (de) | 420 | 420 | 420 | 420 |
|  | Filament count number | 249 | 249 | 249 | 96 |
|  | Individual filament thickness (de) | 1.7 | 1.7 | 1.7 | 4.4 |
|  | Tensile elongation at break (%) | 13.5 | 13.5 | 20.1 | 18.2 |
|  | Dry heat shrinkage at 150° C. (%) | 6.5 | 6.5 | 1.6 | 3.7 |
|  | Twist number (turns/m) |  |  |  |  |
|  | Warp | 0 | 0 | 0 | 0 |
|  | Weft | 0 | 0 | 0 | 0 |
|  | Intrinsic viscosity | 0.86 | 0.86 | 0.81 | 0.83 |

TABLE 2

|  |  |  | Example 1 | Example 2 | Example 3 | Example 4 | Example 5 |
|---|---|---|---|---|---|---|---|
| Gray woven fabric | Weave structure | | Plain | Plain | Plain | Plain | Plain |
| | Cover factor ($\sqrt{de}$ × yarn density (/inch)) | Warp | 1,086 | 1,086 | 840 | 840 | 1,080 |
| | | Weft | 1,045 | 1,045 | 819 | 819 | 1,045 |
| | Difference in cover factor between warp and weft directions ($\sqrt{de}$ × yarn density (/inch)) | | 41 | 41 | 21 | 21 | 35 |
| | Tensile toughness (kg · %/3 cm) | Warp | 1,672 | 1,672 | 1,304 | 1,304 | 1,672 |
| | | Weft | 1,604 | 1,604 | 1,251 | 1,251 | 1,614 |
| | Basis weight (g/m$^2$) | | 205 | 205 | 160 | 160 | 205 |

TABLE 3

|  |  |  | Comparative Example 1 | Comparative Example 2 | Comparative Example 3 |
|---|---|---|---|---|---|
| Gray woven fabric | Weave structure | | Plain | Plain | Plain |
| | Cover factor ($\sqrt{de}$ × yarn density (/inch)) | Warp | 1,086 | 1,086 | 1,039 |
| | | Weft | 1,045 | 1,045 | 994 |
| | Difference in cover factor between warp and weft directions ($\sqrt{de}$ × yarn density (/inch)) | | 41 | 41 | 41 |
| | Tensile toughness (kg · %/3 cm) | Warp | 1,672 | 1,642 | 1,532 |
| | | Weft | 1,604 | 1,614 | 994 |
| | Basis weight (g/m$^2$) | | 205 | 205 | 208 |

TABLE 4

|  |  |  | Example 1 | Example 2 | Example 3 | Example 4 | Example 5 |
|---|---|---|---|---|---|---|---|
| Shrinkage-set woven fabric | Type of shrinkage-setting machine | | Torque motor type multistep metal rolls | The same as the left | The same as the left | The same as the left | Pin tenter |
| | Roll surface temperature or tenter inside temperature (°C.) | | 155 190 | 155 190 | 200 | 200 | 155 200 |
| | Cover factor ($\sqrt{de}$ × yarn density (/inch)) | Warp | 1,231 | 1,231 | 981 | 981 | 1,153 |
| | | Weft | 1,189 | 1,189 | 936 | 836 | 1,128 |
| | Difference in cover factor between warp and weft directions ($\sqrt{de}$ × yarn density (/inch)) | | 42 | 42 | 45 | 45 | 25 |
| | Tensile toughness (kg · %/3 cm) | Warp | 3,756 | 3,756 | 2,930 | 2,930 | 2,311 |
| | | Weft | 3,214 | 3,214 | 2,507 | 2,507 | 2,201 |
| | Basis weight (g/m$^2$) | | 250 | 250 | 195 | 195 | 220 |
| | Basis shrinkage (%) | | 22.0 | 22.0 | 21.9 | 21.9 | 7.3 |
| | Tensile elongation at break (%) | Warp | 40.8 | 40.8 | 33.7 | 33.7 | 33.3 |
| | | Weft | 39.2 | 39.2 | 32.6 | 32.6 | 25.9 |
| | Increase in tensile elongation at break (%) | Warp | 202 | 202 | 150 | 150 | 147 |
| | | Weft | 190 | 190 | 141 | 141 | 181 |
| | Increase in density (%) | Warp | 13.1 | 13.1 | 16.7 | 16.7 | 5.7 |
| | | Weft | 11.8 | 11.8 | 14.3 | 14.3 | 7.1 |

TABLE 5

| | | | Comparative Example | | |
|---|---|---|---|---|---|
| | | | 1 | 2 | 3 |
| Shrinkage-set woven fabric | Type of shrinkage-setting machine | | Tenter | Tenter | Tenter |
| | Roll surface temperature or tenter inside temperature (°C.) | | 200 | 200 | 200 |
| | Cover factor | Warp | 1,121 | 1,111 | 1,113 |
| | ($\sqrt{de}$ × yarn density (/inch)) | Weft | 1,099 | 1,097 | 988 |
| | Difference in cover factor between warp and weft directions ($\sqrt{de}$ × yarn density (/inch)) | | 122 | 14 | 125 |
| | Tensile toughness | Warp | 2,324 | 1,892 | 2,111 |
| | (kg · %/3 cm) | Weft | 2,212 | 1,792 | 1,576 |
| | Basis weight (g/m$^2$) | | 240 | 214 | 225 |
| | Basis shrinkage (%) | | 17.1 | 4.4 | 8.2 |
| | Tensile elongation at break (%) | Warp | 26.2 | 27.3 | 27.8 |
| | | Weft | 21.5 | 25.2 | 25.8 |
| | Increase in tensile elongation at break (%) | Warp | 94.1 | 61.0 | 73.0 |
| | | Weft | 59.2 | 60.0 | 71.0 |
| | Increase in density (%) | Warp | 6.6 | 2.3 | 7.1 |
| | | Weft | 7.8 | 4.3 | 7.1 |

TABLE 6

| | | | Example | | | | |
|---|---|---|---|---|---|---|---|
| | | | 1 | 2 | 3 | 4 | 5 |
| Finished woven fabric | Calendering conditions | | — | One face, 180° C. 80 tons 4 m/min | — | One face, 180° C. 80 tons 4 m/min | One face, 180° C. 80 tons 4 m/min |
| | Calendering | | None | Applied | None | Applied | Applied |
| | Positivity of S"(ε) in 1% ≤ ε ≤ 20% (A) | Warp | Positive | Positive | Positive | Positive | Positive |
| | | Weft | Positive | Negative | Positive | Negative | Negative |
| | S(ε) (kg/3 cm) in ε = 10% (B) | Warp | 30.1 | 34.5 | 22.5 | 28.8 | 74.6 |
| | | Weft | 31.1 | 38.9 | 23.4 | 31.2 | 95.6 |
| | Tensile toughness | Warp | 3,756 | 3,723 | 2,930 | 2,871 | 2,265 |
| | (kg · %/3 cm) (C) | Weft | 3,214 | 3,201 | 2,507 | 2,457 | 2,157 |
| | Air permeability ratio $P_R/P_M$ | | 0.33 | 0.14 | 0.38 | 0.23 | 0.77 |
| | Woven fabric air permeability (liter/dm$^2$/min under 500 Pa) | | 7.5 | 0.7 | 9.5 | 1.0 | 7.8 |
| | Cover factor | Warp | 1,231 | 1,213 | 981 | 932 | 1,072 |
| | ($\sqrt{de}$ × density (/inch)) | Weft | 1,189 | 1,176 | 936 | 899 | 1,049 |
| | Seam slippage value | Warp | 0.2 | 0.2 | 0.4 | 0.2 | 0.2 |
| | (mm) | Weft | 0.2 | 0.2 | 0.4 | 0.3 | 0.2 |

TABLE 7

| | | | Comparative Example | | |
|---|---|---|---|---|---|
| | | | 1 | 2 | 3 |
| Finished woven fabric | Calendering conditions | | — | One face, 180° C. 80 tons 4 m/min | The same as the left |
| | Calendering | | None | Applied | Applied |
| | Positivity of S"(ε) in 1% ≤ ε ≤ 20% (A) | Warp | Negative | Negative | Negative |
| | | Weft | Negative | Negative | Negative |

TABLE 7-continued

|  |  | Comparative Example | | |
| --- | --- | --- | --- | --- |
|  |  | 1 | 2 | 3 |
| S(ε) (kg/3 cm) in ε = 10% (B) | Warp | 81.5 | 78.5 | 121.8 |
|  | Weft | 122.3 | 113.5 | 108.9 |
| Tensile toughness | Warp | 2,324 | 1,887 | 2,025 |
| (kg · %/3 cm) (C) | Weft | 2,212 | 1,787 | 1,486 |
| Air permeability ratio $P_R/P_M$ |  | 0.77 | 0.82 | 0.78 |
| Woven fabric air permeability (liter/dm²/min under 500 Pa) |  | 9.5 | 1.5 | 2.4 |
| Cover factor | Warp | 1,121 | 1,105 | 1,104 |
| ($\sqrt{de}$ × density (/inch)) | Weft | 1,099 | 1,093 | 949 |
| Seam slippage value | Warp | 0.4 | 1.3 | 0.7 |
| (mm) | Weft | 0.5 | 1.5 | 0.6 |

TABLE 8

|  | Example | | | | |
| --- | --- | --- | --- | --- | --- |
|  | 1 | 2 | 3 | 4 | 5 |
| Burst strength of air bag (kg/cm²G/kg/m²) | 9.2 | 9.2 | 9.56 | 9.2 | 6.2 |
| Air permeability ratio $P_R/P_{M'}$ of air bag | 0.23 | 0.11 | 0.30 | 0.20 | 0.65 |

TABLE 9

|  | Comparative Example | | |
| --- | --- | --- | --- |
|  | 1 | 2 | 3 |
| Burst strength of air bag (kg/cm²G/kg/m²) | 6.3 | 3.5 | 2.9 |
| Air permeability ratio $P_R/P_{M'}$ of air bag | 0.65 | 0.67 | 0.66 |

INDUSTRIAL APPLICABILITY

The woven fabric of the present invention for high performance air bags satisfy, when converted into an air bag, all the above-mentioned requirements (1) to (3) which are necessary to the air bags, and thus the resultant air bag exhibits an excellent safety and has a high practical fullness.

We claim:

1. A woven fabric for high performance air bags, comprising polyester filament warp and weft yarns and satisfying all the requirements that:

(A) in at least one of the stress-strain curves of the woven fabric in the warp and weft directions thereof, where the tensile elongation ε in units of % of the woven fabric is in the range of:

$$1\% \leq \epsilon \leq 20\%,$$

a derivation of the second order S"(ε) of tensile strength S(ε) in units of kg/3 cm, which is a derived function of high order from tensile elongation ε, is substantially positive, (B) where the tensile elongation (ε) of the woven fabric is in the range of:

$$\epsilon \leq 10\%,$$

the tensile strength S(ε) of the woven fabric is 10 to 100 kg/3 cm in each of the warp and weft directions thereof; and (C) in each of the graphs showing stress-strain curves of the woven fabric in the warp and weft directions thereof, where a tensile toughness of the woven fabric in each of the warp and weft directions thereof is represented by an area of a region defined by the stress strain curve and a transverse straight line corresponding to a stress of zero and drawn in parallel to the axis of abscissas of each graph, the woven fabric has a tensile toughness of 2000 to 4000 kg.%/3 cm in each of the warp and weft directions thereof.

2. The woven fabric for air bags as claimed in claim 1, wherein a ratio $P_R/P_M$ of the woven fabric is in the range of from 0.01 to 0.60, in which ratio $P_R/P_M$, where air permeabilities in units of liter/dm²/min of the woven fabric are measured under a pressure of 500 Pa at 100 points located in the intersections of 10 lines drawn on the woven fabric in parallel to the longitudinal axis of the woven fabric at predetermined intervals with 10 lines drawn on the woven fabric at right angles to the longitudinal axis of the woven fabric at intervals of about one meter, $P_R$ represents the difference in air permeability between the largest and the smallest of the measured air permeabilities, and $P_M$ represents an average of all the air permeabilities measured at the 100 points.

3. The woven fabric for air bags as claimed in claim 1, wherein where an air bag is made by cutting the woven fabric into two circular pieces having a diameter of about 700 mm, superimposing the circular pieces on each other, and seam-joining the superimposed pieces at circumferential portions thereof to form a circular seam line having a diameter of 670 mm with double row stitches, and bursted by blowing 40 liters of high pressure air having a pressure of 30 kg/cm² at instance into the air bag within a time of 100 msec from the blowing, the air bag exhibits a burst strength represented by an inner pressure of the air bag upon bursting, of 4.0 to 10.0 kg/cm²G.

4. The woven fabric for air bag as claimed in claim 2, wherein where the woven fabric is cut into 200 circular pieces having a diameter of about 700 mm, every two pieces of them are superimposed and are seam-joined at circumferential portions thereof with double row stitches to form a circular seam line having a diameter of 670 mm, to provide 100 air bags, the 100 air bags are subjected to measurement of air permeability by blowing air into the air bags under a pressure of 980 Pa, and the difference in air permeability $P_R'$ between the largest and the smallest of the measured air permeability values and an average $P_M'$ of all the measured air permeability values are determined, the ratio $P_R'/P_M'$ is 0.01 to 0.50.

5. The woven fabric for air bags as claimed in claim 1, wherein a seam slippage value of the woven fabric is 0.1 to 1.0 mm determined under a load of 120 kg/5 cm applied to the woven fabric in each of the warp and weft directions of the woven fabric.

6. The woven fabric for air bags as claimed in claim 1, wherein cover factors of the woven fabric are 1,000 to 1,280 determined in each of the warp and weft directions of the woven fabric, and a difference in the cover factor between the warp and weft directions of the woven fabric is 5 to 100.

7. The woven fabric for air bags as claimed in claim 2, wherein the air permeability of the woven fabric under a pressure of 500 Pa is 0.2 to 9.5 liters/dm$^2$/min.

8. The woven fabric for air bags as claimed in claim 1, wherein one surface of the woven fabric has been calendered.

9. A process for producing a woven fabric for high quality air bags as claimed in claim 1, comprising the steps of:

weaving warp and weft yarns consisting of untwisted polyester filament yarns having a tensile elongation at break of 9 to 18% and a dry heat shrinkage at 150° C. of 3 to 13%, to provide a gray weave having a tensile toughness of 1,000 kg.%/3 cm or more but less than 2,000 kg.%/3 cm in each of the warp and weft directions of the gray weave; and applying a shrinkage-setting treatment to the gray weave without or after applying a scouring treatment thereto, the shrinkage-setting treatment being controlled to an extent such that an increase in each of the warp and weft densities of the gray weave or the scoured weave is 5 to 25% and an increase in tensile elongation at break of the weave in each of the warp and weft directions thereof is 70 to 250%.

10. The process for producing a woven fabric for air bags as claimed in claim 9, wherein the polyester filament yarns have an individual filament thickness of 1.0 to 2.5 denier.

11. The process for producing a woven fabric for air bags as claimed in claim 9, wherein the polyester filament yarns have a tensile strength of 9.0 to 13.0 g/denier.

12. The process for producing a woven fabric for air bags as claimed in claim 9, wherein the gray weave has cover factors of 800 to 1150 in the warp and weft directions thereof.

13. The process for producing a woven fabric for air bags as claimed in claim 12, wherein a difference in cover factor of the gray weave between the warp and weft directions is 5 to 100.

14. The process for producing a woven fabric for air bags as claimed in claim 9, wherein the shrinkage-setting treatment is carried out by using a multistep metal roll setting machine provided with a plurality, of metal rolls each having a peripheral temperature adjusted to from 150° C. to 230° C.

15. The process for producing a woven fabric for air bags as claimed in claim 14, wherein the multistep metal roll setting machine has 3 to 30 metal rolls supported at both the ends thereof, each of the rolls being driven by a torque motor.

16. The process for producing a woven fabric for air bags as claimed in claim 14, wherein the shrinkage-setting treatment is applied to the gray weave or scoured weave, while applying to the weave substantially no tension in the weft direction and a tension of 10 to 500 g/cm in the warp direction alone.

17. The process for producing a woven fabric for air bags as claimed in claim 14, wherein the shrinkage-setting treatment is carried out by using the multistep metal roll setting machine in such a manner that the temperature of a portion of the weave located in an outlet section of the setting machine is controlled to a higher level than that of a portion of the weave located in an inlet section of the setting machine so as to impart an inclination to the surface temperature distribution of the weave forwarding through the setting machine.

18. The process for producing a woven fabric for air bags as claimed in claim 16, wherein the shrinkage-setting treatment by the multistep metal roll setting machine is controlled by adjusting a sum of contact lengths of the metal roll peripheries with the gray of scoured weave to from 3 to 50 m and a minimum contact angle between the metal roll peripheries and the gray or scoured weave to from 10 to 90 degrees.

\* \* \* \* \*